June 22, 1943.  W. O. LYTLE  2,322,581
MANUFACTURE OF CELLULAR BODIES
Filed Jan. 22, 1938
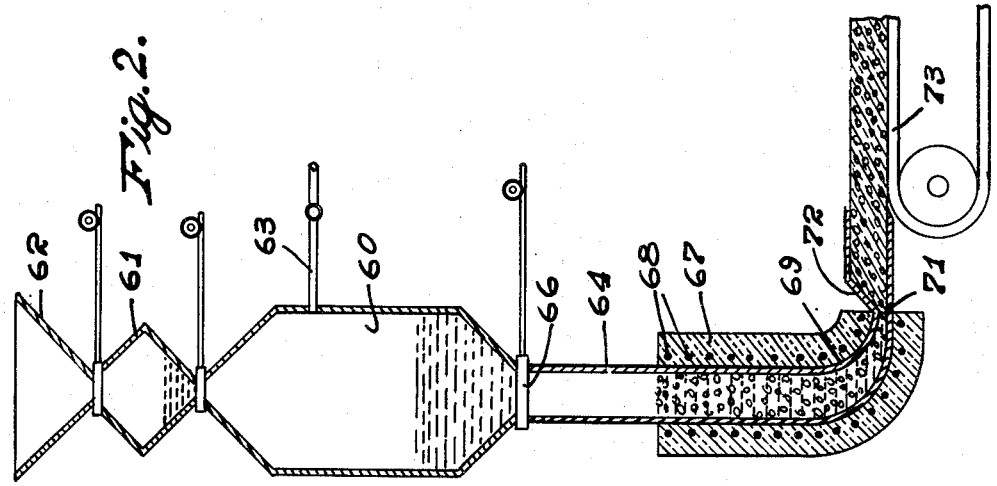
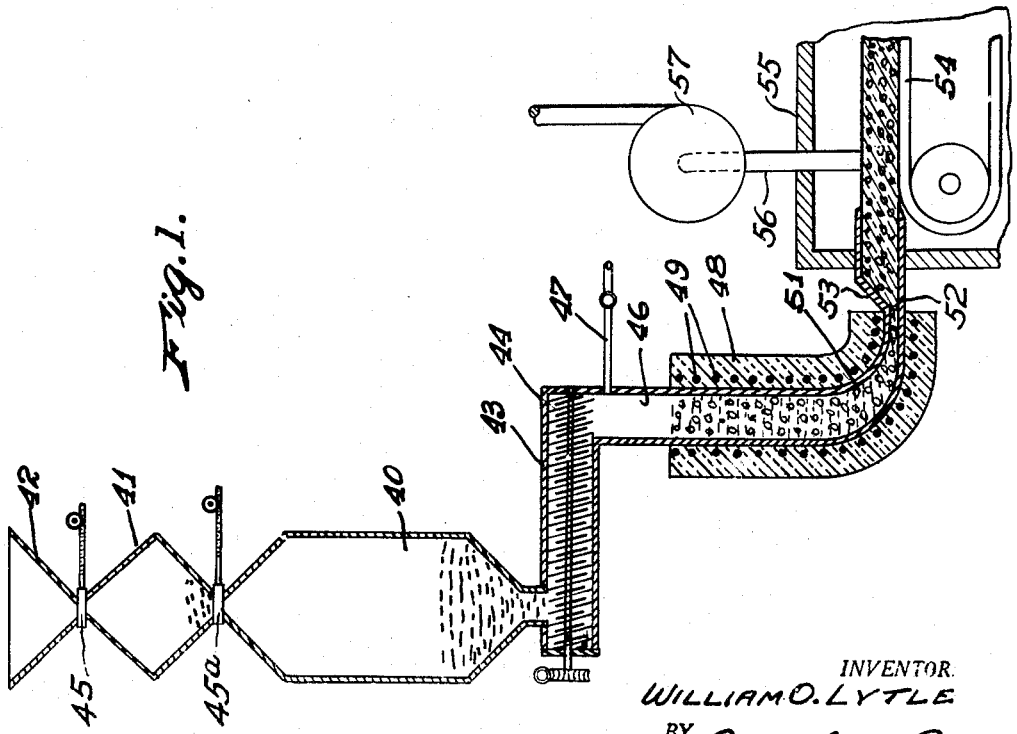
INVENTOR.
WILLIAM O. LYTLE
BY Bradley & Bee
ATTORNEYS.

Patented June 22, 1943

2,322,581

UNITED STATES PATENT OFFICE 2,322,581

MANUFACTURE OF CELLULAR BODIES

William O. Lytle, New Kensington, Pa., assignor to Pittsburgh Plate Glass Company, Allegheny County, Pa., a corporation of Pennsylvania Application January 22, 1938, Serial No. 186,382

1 Claim. (Cl. 49—77)

The present invention relates to the manufacture of cellular material suitable for use as insulating media against the transmission of heat and sound and it has particular relation to the manufacture of such materials from glass or glass-like substances such as blast furnace slag.

One object of the invention is to provide a process of preparing highly porous or cellular bodies from glass, blast furnace slag, or similar relatively refractory but thermoplastic materials which is simple, requires relatively small expenditure of labor, which is continuous in operation and which results in a product having exceptionally satisfactory properties for use as an insulating medium against the transmission of heat and as a light weight building material.

It is well known that cellular or porous materials comprising a solid or a fibrous material containing a myriad of small interstices or cells filled with partially or completely entrapped air or other gaseous medium possess exceptional value as insulating media against the transmission of heat and sound. Among the commoner materials which have ben employed for purposes of heat and sound insulation may be included fibrous substances such as asbestos, cellulose fibers, or cellular materials such as cork and the like. None of these materials is entirely satisfactory. For example, the asbestos is fairly expensive and lacks in mechanical strength. Furthermore, it tends to pack down during service, the insulating value thereof is thus impaired. The organic materials are lacking in resistance to heat and are but poorly resistant to fire. Moreover, the resistance to acids, alkalies and other chemicals is but slight.

It has heretofore been proposed to substitute for such materials slabs or blocks of material containing numerous voids or gas cells therein, obtained by liberation of a gas in molten or plastic glass, or similar materials. Various methods have been suggested for preparing the cellular bodies. One method involves the incorporation of carbon in the form of charcoal, into molten or at least plastic glass. This material by reason of heat and chemical action is decomposed in the glass to liberate carbon dioxide or carbon monoxide as more or less uniformly distributed bubbles. This method is objectionable because of the difficulty of obtaining satisfactory bubble distribution. Moreover, decomposition of the gassing agent before its complete incorporation into the glass often occurred.

A second method involves subjecting relatively fluid glass to vacuum whereby to liberate and expand the entrapped or absorbed gases as innumerable small bubbles distributed through the mass. The product obtained by such method is unsatisfactory, for many purposes, because it comprises substantially continuous bodies of vitreous glass in which the bubbles are entrapped. Usually the specific gravity of such masses is relatively high and the insulating value is comparatively low. Furthermore, by reason of the dense vitreous character of the material it is difficult to cut it and shape it to suitable size and form. Furthermore, the methods as heretofore proposed are intermittent in character and require a relatively large number of individual molds which must be separately filled, thus necessitating expenditure of much time and labor.

According to the provisions of the present invention the foregoing difficulties are substantially obviated by admixing glass or glass-like material such as blast furnace slag in a relatively finely divided condition with a gassing agent designed to be decomposed at or near the softening temperature of the glass and then heating and extruding the resultant material through a suitable orifice as a continuous stream under such conditions that the liberated gases expand after extrusion to form a highly porous refractory sheet or strip which may be cut into blocks or slabs of suitable dimensions.

For a better understanding of the invention reference may now be had to the accompanying drawing in which Figures 1 and 2 illustrate diagrammatically certain embodiments of apparatus suitable for use in practicing the invention.

In the drawing like numerals refer to like parts throughout.

In the form of the invention disclosed in Figure 1 a supply chamber 40 has an air-lock 41, a hopper 42 and a conveyor tube 43. Valves 45 and 45a are disposed between the air-lock and the hopper and also between the air-lock and the chamber.

A screw conveyor 44 is disposed in tube 43 and the tube at its forward end discharges downwardly into a columnar extrusion chamber 46 of tubular form, which chamber, adjacent to its upper extremity, is connected by means of a conduit 47 to a source (not shown) of gas under compression. The lower portion of the chamber extends into a furnace 48 which may be heated electrically, for example, by means of resistance elements 49. At its lower extremity the chamber 46 is provided with a laterally-extending portion 51 which tapers to a restricted orifice 52. This orifice discharges into an outwardly-flaring nozzle 53 which permits the mass to expand as it emerges from the orifice and also shapes the mass to desired cross-sectional contour as it is expanded.

The nozzle 53 discharges upon a horizontal conveyor 54 which leads to or extends through an annealing lehr 55, which may be connected by a conduit 56 to a vacuum pump 57.

In the operation of this embodiment of the invention a crushed material such as glass of the formula or ordinary sheet glass, or blast furnace slag in admixture with a gassing agent is introduced into the hopper 42. A suitable batch comprises glass crushed to a particle size such that practically all thereof will pass through a screen of 28 mesh and be retained upon a screen of 100 mesh. For some grades of product coarser or finer material, or a material of a more limited particle size within the above range may be employed. The batch may be introduced cold or it may be preheated to any desired temperature, e. g., 1000 or 1200° F.

The gassing agent preferably is calcium carbonate and is employed in pulverized form in the proportion of about 1 or 2 per cent, e. g., 1.5 per cent.

The material in the hopper is allowed to drop into the air-lock chamber 41 while the valve 45a is closed. Subsequently valve 45 is closed and valve 45a is opened to permit the material to drop into the chamber 40.

The material in chamber 40 is fed into tube 43, and is propelled by screw 44 until it drops into chamber 46 where it is quickly heated to plastic state and to the temperature of decomposition of the gassing state. Preferably the working temperature is about 1600 to 1750° F.

Fluid under compression such as air may also be introduced into the chamber through the conduit 47 in order to maintain the system under pressure. This pressure might be varied for different operating conditions and products, for example pressures of 50 to 100 lbs. per square inch may be employed. However, higher or lower pressures may also be employed if so desired.

At the foregoing temperatures the glass is sufficiently plastic to flow with comparative ease through the orifice 52. However, the bubbles of gas generated therein are retained in relative uniform distribution throughout the mass. Even the cell walls of the larger bubbles seem to be of porous texture, a property which perhaps is imparted thereto in part by the formation of minute bubbles of carbon dioxide from the calcium carbonate.

It would also appear that the particles of glass are only sintered together at their points of contact, thus leaving numerous small interstices or voids in the mass. The degree of expansion of the material in the tube may be controlled at will by increasing or decreasing the amount of calcium carbonate employed in the mass, or the degree of pressure in the system and by varying the temperatures. The use of subatmospheric pressure in or externally of the nozzle is also contemplated as a method of decreasing density. Under ordinary operating conditions the mass as it leaves the orifice 52 will expand to about 7 to 10 times the volume of the batch introduced into the hopper 14 and has a weight of about 14 or 15 pounds per cubic foot. The resultant product therefore contains a great many voids or dead air spaces and is of but low specific gravity or density. It may readily be cut by sawing or by other convenient means and may be nailed without fracture. Therefore it constitutes an inexpensive, highly fire-resistant and chemically inert insulating medium. It also possesses considerable mechanical strength and does not tend to pack down during service.

The manufacture of very light products as well as heavier products is contemplated. For example, it is considered to be entirely possible to obtain products the weight of which varies within a range of 10 to 75 lbs. per cubic foot, or even more or less.

The formation of the cellular mass at a temperature somewhat below the true melting point of glass has been described in detail. However, it will be apparent that if desired the glass may be heated to such temperature that it becomes molten and relatively fluid rather than being merely plastic.

A substantial space may be maintained between the top of the mass of pulverulent material in the chamber 46 and the forward extremity of the screw 44. Pneumatic pressure generated by the fluid introduced through the conduit 47 may therefore act directly upon the top of the mass, thus forcibly impelling the molten material in the laterally curving portion 51 through the orifice 52.

In the embodiment of the apparatus disclosed in Figure 2 a chamber 60 having air-lock 61, hopper 62, and inlet 63 for fluid under compression, discharges into a columnar extruding chamber 64 through a valve 66. The lower portion of the chamber 64 is enclosed in a furnace 67 which may be heated by convenient means such as electrical elements 68.

The chamber 64 at its lower extremity has a laterally curving portion 69 tapering to an orifice 71 that discharges into outwardly flaring nozzle 72, the nozzle in turn discharges upon conveyor 73, leading to a lehr (not shown).

The operation of this form of the invention is identical with that of the form disclosed in Figure 1 except that the pulverulent material from the container 60 is allowed to drop by gravity without interposition of a feed screw, into the extruding chamber.

If desired, in the embodiments of the invention disclosed, the height of the chambers 46 and 64 may be sufficiently great that the pulverized glass and calcium carbonate, or other gassing agent, in falling therethrough, will be preheated to a temperature but little below that of decomposition of the gassing agent. The particles of glass will then fuse together as they collect upon top of the mass in the extrusion chamber, and will be expanded by liberation of gases with but slight tendency to form a skull or strata of fairly rigid, sintered but unexpanded glass particles.

Although only certain preferred forms of apparatus suitable for practicing the invention have been disclosed, it will be apparent to those skilled in the art that numerous modifications may be made therein without departure from the spirit of the invention or the scope of the appended claim.

What I claim is:

A process of preparing heat-resistant cellular masses, which process comprises dropping a mixture of a heat-resistant thermoplastic material and an agent decomposable by heat to form a gas, said thermoplastic material having a sintering point below that of decomposition of the agent and having a temperature of complete melting above that of decomposition of the agent, through a chamber so heated that the mixture while falling is heated approximately to the sintering temperature of the material, collecting the heated mixture as it falls in a body in the lower portion of the chamber, the mixture being brought by the heat in the chamber to an ultimate temperature above that of sintering of the material and decomposition of the agent, but below that of complete melting of the material, then extruding the sintered and coherent mass containing many bubbles of gas entrapped therein through an orifice at the base of the chamber to form a cellular mass.

WILLIAM O. LYTLE.